Dec. 15, 1925.  1,565,673
C. RICK
FAUCET
Filed Aug. 17, 1923   2 Sheets-Sheet 1

Inventor:
Chester Rick,
By C. B. des Jardins
Attorney.

Dec. 15, 1925. 1,565,673
C. RICK
FAUCET
Filed Aug. 17, 1923 2 Sheets-Sheet 2
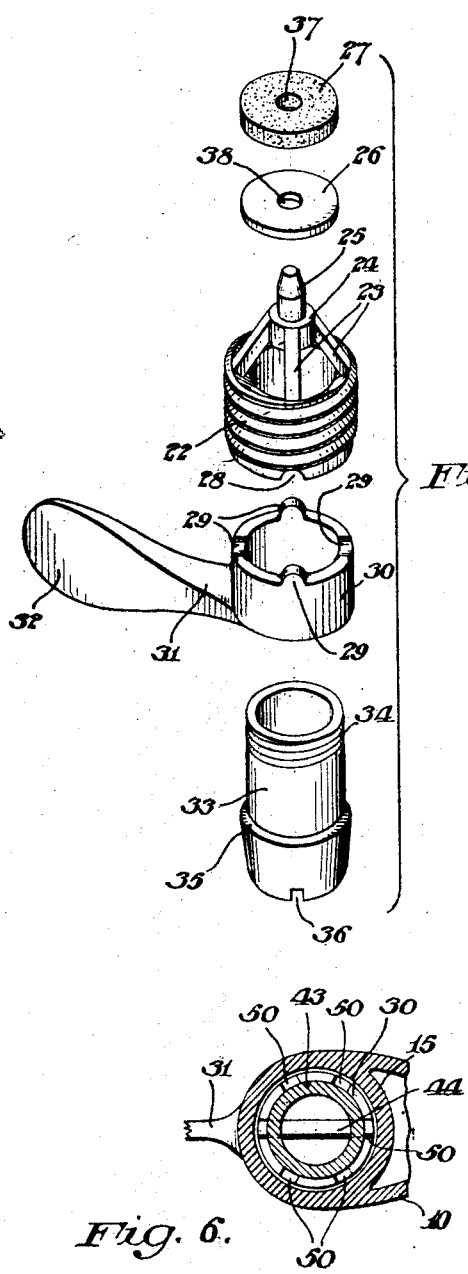
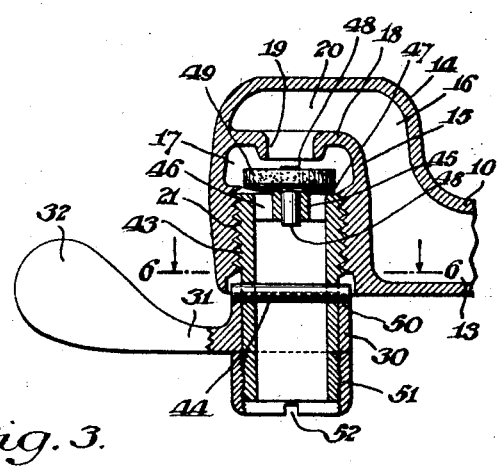
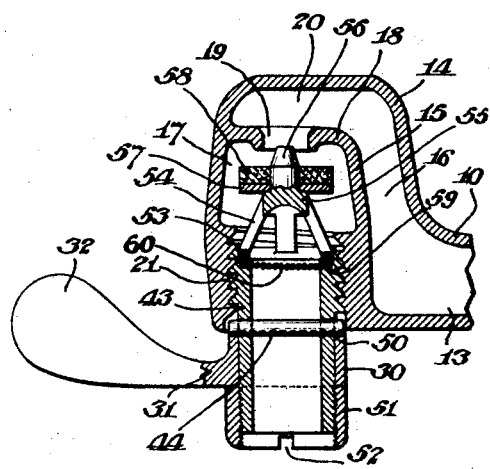
Inventor:
Chester Rick, Patented Dec. 15, 1925.

1,565,673

UNITED STATES PATENT OFFICE.

CHESTER RICK, OF PHILADELPHIA, PENNSYLVANIA.

FAUCET.

Application filed August 17, 1923. Serial No. 657,880.

*To all whom it may concern:*

Be it known that I, CHESTER RICK, a citizen of the United States, residing at Philadelphia, in the county of Philadelphia and State of Pennsylvania, have invented certain new and useful Improvements in Faucets, of which I declare the following to be a full, clear, and exact description.

My invention relates to improvements in faucets and has to do, more particularly, with improvements in the construction of faucets or valves of the bib type.

The chief object of my present invention is to provide an improved faucet construction which shall be attractive in appearance, economical to manufacture and efficient in operation.

Another object of my invention is to provide a faucet which is so constructed that, when viewed from above, it does not present any cracks or crevices in which dirt can lodge.

A further object of my invention is to provide a faucet construction having an exterior surface without any angles less than ninety degrees, so as to permit a decided saving in the cost of manufacture particularly when the faucet bodies are to be nickel-plated or polished, and having a spout which is comparatively high with respect to the shank of the faucet.

A further object of my invention is to provide a faucet construction which can be adjusted very quickly and easily to compensate for wear of the valve disk.

Another object of my invention is to provide a faucet or valve construction in which wear of the valve disk is lessened.

Another object of my invention is to provide a faucet construction in which the handle is detachably connected to the valve member by a removable spout member.

A further object of my invention is to provide a faucet construction in which movement of the rotatable valve member is limited by engagement of the handle with the body of the faucet.

Further objects, and objects relating to details and economies of construction and operation, will definitely appear from the detailed description to follow. In one instance, I accomplish the objects of my invention by the devices and means described in the following specification. My invention is clearly defined and pointed out in the appended claims. Constructions constituting preferred embodiments of my invention are illustrated in the accompanying drawings, forming a part of this specification, in which:

Fig. 3 is a perspective view of the parts of the faucet removed from the body and separated from each other.

Fig. 5 is a vertical, sectional view through another modification of the construction.

Fig. 6 is a horizontal, sectional view taken on line 6—6 of Fig. 5, and

Fig. 7 is a vertical, sectional view through another modification of my invention.

In the drawings, the same reference numerals refer to the same parts throughout the several views and the sectional views are taken looking in the direction of the arrows at the ends of the section lines.

Figure 1:
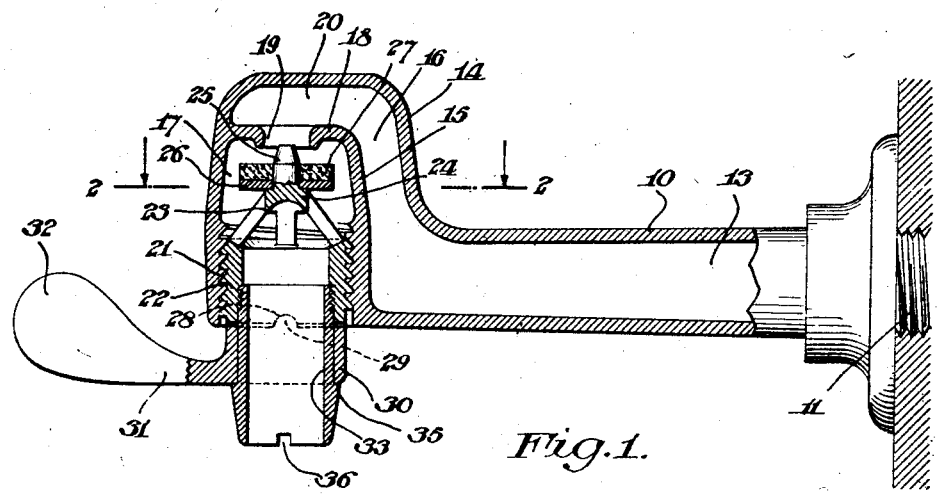
Fig. 1 is a longitudinal, vertical, sectional view through a faucet constructed in accordance with my invention.

My invention consists in providing a faucet body which has a tubular shank adapted to be connected with the usual supply pipe and an enlargement at its outer end in which there is an internal partition wall dividing the enlarged end of the body into a valve chamber and a supply passage. The inlet to the valve chamber is formed in the partition wall, at the top of the valve chamber, and provided with a suitable valve seat. The wall of the valve chamber is internally threaded and a tubular valve member, having an external or male thread, screws into the internal or female thread of the valve chamber. The valve disk is supported by this tubular valve member, in cooperative relationship with the valve seat, in such a way that liquid may pass out from the valve chamber through this tubular valve member. A handle is connected to this tubular valve member so that the latter may be rotated to move the valve disk toward and away from the valve seat. Any suitable connection between the handle and the tubular valve member may be used but I propose to provide a detachable connection so that the handle may be adjusted with respect to said valve member to compensate for wear of the valve disk. I propose to provide the valve member and the handle with interlocking portions and to hold such portions in engagement with each other by a spout member screwed on to the valve member and engaging the handle. I propose to mount the valve disk on a metal disk or member, which is rotatable with respect to its support, with comparatively little friction, so that it may move on said support as the fiber valve disk contacts with the valve seat, thus avoiding wear due to movement of the fiber disk on the metal valve seat. I also propose to provide the handle with an enlargement which will contact with the body of the faucet to limit the rotation of the tubular valve member.

Referring to the numbered parts of the drawings, the body or casing of the faucet is preferably a casting having a shank, 10, the end of which is screw-threaded, at 11, for connection with the usual supply pipe. The shank, 10, has a supply passage, 13, therethrough. The outer end of the faucet body is enlarged, at 14, and the internal partition wall, 15, divides the interior of the body into the valve chamber, 17, and the upwardly-extending supply passage, 16. The horizontally-extending portion, 18, of the partition wall forms the upper end wall of the valve chamber and the latter communicates with the portion, 20, of the supply passage through an inlet opening having the valve seat, 19. The wall of the valve chamber, 17, is internally threaded, at 21, and a tubular valve member, 22, having an external or male thread, screws into the valve chamber. From the upper end of the tubular valve member, 22, extends a spider, 23, having an axially-disposed boss, 24, from which projects the stud, 25. A metal disk, 26, having a central opening, 38, rests on the boss, 24, with stud, 25, extending through said opening, and the fiber valve disk, 27, having a central opening, 37, rests on the metal disk, 26, the valve disk being held centered by stud, 25, which passes through opening, 37. As the tubular valve member, 22, is rotated, the valve disk, 27, is moved toward or away from the valve seat, 19. The screw threads on the valve chamber wall and the exterior of the valve member, 22, are comparatively coarse so that a slight rotation of the valve member gives a considerable vertical movement to the valve disk. The metal disk, 26, may turn freely on the boss, 24, so that, when the fiber valve disk, 27, comes into contact with the valve seat, 19, the disk is held stationary while the boss, 24, turns with respect to the metal disk, 26. This prevents wear of the fiber disk and the wear caused by the metal surfaces, 24 and 26, rubbing on each other is not objectionable.

The handle, 31, has an annular portion, 30, with a series of projections, 29, on its upper edge, which are adapted to seat in notches, 28, formed in the lower edge of the tubular valve member, 22. The handle is held in fixed relation with respect to the valve member, 22, by a tubular spout member, 33, which is screwed in to the lower end of the tubular valve member, 22, and has an external shoulder, 35, engaging the lower edge of the annular portion, 30, of the handle. The lower edge of the spout member may be notched, as at 36, for engagement by any convenient tool in screwing or unscrewing the spout member. The handle, 31, is enlarged and extends upwardly somewhat, at 32, so that this part of the handle will come into contact with the body of the faucet and limit the rotation of the tubular valve member, 22.

Figure 2:
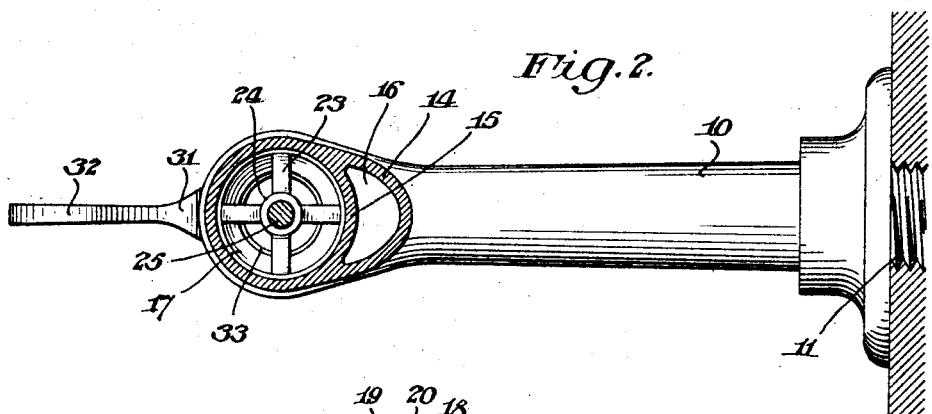
Fig. 2 is a horizontal, sectional view taken on the line 2—2 of Fig. 1.
Figure 4:
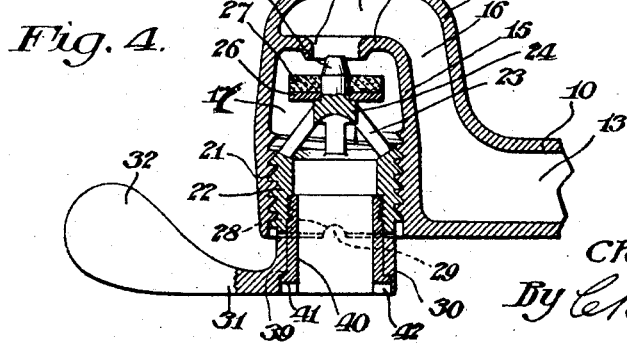
Fig. 4 is a view corresponding to Fig. 1 but showing a slightly modified structure.

The construction shown in Fig. 4 is substantially the same as that shown in Figs. 1, 2 and 3, which I have just described, with the exception that I have shown a spout member, 40, which does not project below the handle, 31, thus making a more compact structure. In this form of my invention, the spout, 40, is screwed into the lower end of the tubular valve member, 22, and has a flange, 41, at its lower end, which engages an internal shoulder, 39, in the annular portion, 30, of the handle. The lower edge of this spout member may be notched, at 42, for engagement by a suitable tool.

In Figs. 5 and 6, I have shown another modification, in which the tubular valve member, 43, has an external or male thread at its upper portion meshing with the female thread, 21, in the wall of the valve chamber, 17. In this form, there is a somewhat different support for the valve disk. At the upper end of the valve member, 43, there is the transverse web, 45, having a number of openings, 46, through which liquid can flow to the interior of the valve member. A metal disk, 47, secured to a stud, 48, rests on the web, 45, with the stud, 48, in a central opening in said web. The fiber valve disk, 49, is supported by the metal disk, 47, with the upper end of the stud, 48, in a central opening in the valve disk. The stud, 48, and disk, 47, may turn freely with respect to the web, 45, so as to prevent wear of the valve disk, 49, in the same manner as in the form previously described. I have shown here a different connection between the handle and the tubular valve member. The latter carries a cross pin, 44, extending diametrically and with its ends projecting slightly beyond the outer surface thereof. The ends of the cross pin, 44, are adapted to seat in notches, 50, formed in the upper edge of the annular portion, 30, of the handle, 31, through which the lower part of the tubular valve member, 43, extends. The handle is held in fixed relation with respect to said member by the nut or spout member, 51, which is screwed on the lower end of the valve member, 43, and engages the lower surface of the annular portion of the handle. This nut or spout member may be notched, at 52, as in the forms previously described.

In Fig. 7, I have shown a different method of supporting the valve disk from the tubular valve member. A ring, 53, rests on the edge of a filter disk, 60, supported on an internal shoulder, 59, formed at the upper end of the tubular valve member, 43, and this ring carries the spider or tripod, 54, and the boss, 55, having the stud, 56. The metal disk, 57, rests on this boss, 55, and the fiber valve disk, 58, rests on the disk, 57, as in the construction shown in Figs. 1, 2 and 3. The screen, 60, filters the water and gives a smoother stream from the faucet.

The operation of my improved faucet construction will appear from the foregoing description. The valve disk is moved toward or away from the valve seat, 19, by rotating the tubular valve member. When the valve disk is raised into contact with the valve seat, the inlet to the valve chamber, 17, is closed and flow through the faucet is cut off. When the valve disk is lowered away from the valve seat, liquid may flow from the supply passage through the inlet opening into the valve chamber and out through the tubular valve member and the spout member. The valve chamber is formed in the body of the faucet by the internal partition wall, 15, and the wall of the valve chamber has a female thread with which the male thread on the tubular valve member meshes. This makes a construction which is very compact, results in a saving of material, and is economical to manufacture since the exterior of the faucet casing or body may be formed without any corners or angles which are less than a right angle. This is important since the presence of acute angles adds considerably to the cost of polishing or buffing the faucet body. Furthermore, with this construction, there are no upwardly-opening cracks or crevices in which dirt can lodge. Faucets of this type are frequently used in kitchens and this feature makes a device which can be kept clean easily thus making it attractive to the housewife and improving the appearance of the structure. The fiber valve disk is not rigidly fastened to the rotatable valve member and, therefore, the valve disk is not caused to rub against the valve seat as the valve member is rotated to force the valve disk against said seat. As the fiber disk is brought into contact with the valve seat, it is held against movement and the valve member is free to turn with respect to the metal disk on which the fiber disk rests, as I have already pointed out. This prevents excessive wear of the fiber disk. This improved faucet construction can be assembled and taken to pieces very easily. By unscrewing the spout member, the handle can be removed from the tubular valve member and the latter can be rotated freely to unscrew it from the faucet body. In case the fiber valve disk should wear so that it is not pressed tightly against the valve seat, when the valve member is rotated to the limit permitted by the handle, the position of the handle may be changed with respect to the valve member. This may be accomplished by unscrewing the spout member so as to let the handle drop somewhat and then giving the handle a partial rotation so that a different set of notches in the valve member are engaged by the projecting lugs on the handle.

I am aware that the faucet construction illustrated in the accompanying drawings may be changed considerably without departing from the spirit of my invention and, therefore, I claim my invention broadly, as indicated by the appended claims.

Having thus described my invention, what I claim as new and useful and desire to secure by Letters Patent is:—

1. A faucet comprising a body having a supply passage and a valve chamber separated by an internal partition wall, there being an inlet opening in said wall at the upper end of said valve chamber, a tubular member connected with said body and rotatable with respect thereto, a valve carried by said tubular member for closing said inlet opening, a spout member secured to and projecting below said tubular member, and a handle clamped between said members.

2. A faucet comprising a body having a supply passage and a valve chamber separated by an internal partition wall, there being an inlet opening in said wall at the upper end of said valve chamber, a tubular member connected with said body and rotatable with respect thereto, a valve carried by said tubular member for closing said inlet opening, a spout member secured to and projecting below said tubular member, a shoulder on said spout member, and a handle clamped between the lower end of said tubular member and the shoulder on the spout member.

3. A faucet comprising a body having a supply passage and a valve chamber separated by an internal partition wall, there being an inlet opening in said wall at the upper end of said valve chamber, a tubular member connected with said body and rotatable with respect thereto, a valve carried by said tubular member for closing said inlet opening, a spout member secured to said tubular member, a shoulder on said spout member, a handle positioned between said shoulder and the tubular member, and cooperating elements on said handle and one of said members for preventing rotation of said handle with respect to said members.

4. A faucet comprising a body having a supply passage and a valve chamber separated by an internal partition wall, there being an inlet opening in said wall at the upper end of said valve chamber, a tubular member connected with said body and rotatable with respect thereto, a valve carried by said tubular member for closing said inlet opening, a handle, and a spout member having a screw thread connection with the tubular member and engaging the handle for detachably connecting the latter to said tubular member and to said spout member.

5. A device of the class described comprising a faucet body having a valve chamber and a supply passage, a valve seat at the upper end of said valve chamber, a female thread formed in the wall of said valve chamber, a tubular valve member having a male thread meshing with said female thread, a handle detachably and adjustably connected to said valve member by cooperating elements formed integral with said handle and valve member for holding said parts against relative rotation, and a valve disk carried by said valve member and cooperating with the valve seat.

6. A device of the class described comprising a faucet body having a valve chamber and a supply passage leading thereto, a valve seat between said chamber and passage, a tubular valve member having a screw-thread connection with said body, a valve disk carried by said member and cooperating with said valve seat, a handle, and a spout member having a screw-thread connection with the valve member and engaging the handle for detachably connecting it to the valve member.

7. A device of the class described comprising a faucet body having a valve chamber and a supply passage leading thereto, a valve seat between said chamber and passage, a tubular valve member having a screw-thread connection with said body and having a plurality of notches in its lower edge, a valve disk carried by said member and cooperating with said valve seat, a handle having an annular portion provided with projections fitting in said notches, and a spout member screwed on said valve member, the annular portion of the handle fitting said spout member.

8. A faucet comprising a body having a supply passage and a valve chamber separated by an internal partition wall, there being an inlet opening in said wall at the upper end of said valve chamber, a tubular member connected with said body and rotatable with respect thereto, a valve carried by said tubular member for closing said inlet opening, a handle, a spout member having a screw thread connection with the tubular member and engaging the handle for detachably connecting it to said tubular member, and cooperating elements on said handle and tubular member for preventing relative rotation of said parts.

In testimony whereof, I affix my signature.

CHESTER RICK.